(12) United States Patent
Leonard

(10) Patent No.: US 9,590,885 B1
(45) Date of Patent: Mar. 7, 2017

(54) SYSTEM AND METHOD OF CALCULATING AND REPORTING OF MESSAGES EXPIRING FROM A QUEUE

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 498 days.

(21) Appl. No.: 13/802,325

(22) Filed: Mar. 13, 2013

(51) Int. Cl.
G06F 15/173 (2006.01)
H04L 12/26 (2006.01)
G06F 9/54 (2006.01)

(52) U.S. Cl.
CPC .............. H04L 43/10 (2013.01); G06F 9/546 (2013.01); G06F 2209/548 (2013.01)

(58) Field of Classification Search
CPC ........................ G06F 9/546; G06F 2209/548
See application file for complete search history.

(56) References Cited

U.S. PATENT DOCUMENTS

| | | | |
|---|---|---|---|
| 5,680,551 A * | 10/1997 | Martino, II | ............. G06F 9/546 709/206 |
| 7,782,885 B1 | 8/2010 | Sabato et al. | |
| 8,196,151 B1 * | 6/2012 | Leonard | ........................ 719/314 |
| 8,397,244 B2 | 3/2013 | Surlaker et al. | |
| 8,639,965 B1 | 1/2014 | Anugu et al. | |
| 9,432,445 B1 | 8/2016 | Leonard | |
| 2003/0231593 A1 | 12/2003 | Bauman et al. | |
| 2004/0117794 A1 | 6/2004 | Kundu | |
| 2004/0215998 A1 | 10/2004 | Buxton et al. | |
| 2004/0244007 A1 | 12/2004 | Garza et al. | |
| 2005/0089053 A1 | 4/2005 | Zhu | |
| 2006/0106960 A1 * | 5/2006 | Hickson et al. | ................. 710/52 |
| 2006/0133278 A1 * | 6/2006 | Hill | ......................... H04L 47/10 370/235 |
| 2006/0146711 A1 | 7/2006 | Anbarani | |

(Continued)

OTHER PUBLICATIONS

Duchovni, Victor, "Postfix Bottleneck Analysis", Dec. 25, 2006. 9 pages.

(Continued)

*Primary Examiner* — Chirag R Patel
*Assistant Examiner* — Rachel J Hackenberg

(57) ABSTRACT

A system is provided for monitoring message queue data. The system includes a computer readable storage medium comprising a message counter component stored as a set of computer instructions executable by a processor. The counter component detects the outflow of messages comprising at least expired messages and at least received messages out of a message queue. The counter component differentiates the outflow of expired messages from the outflow of received messages. The counter component collects message queue data, wherein collecting the message queue data comprises at least counting the outflow quantity of expired messages or at least counting the outflow quantity of received messages. The counter component calculates at least one of a plurality of message counting metrics based on at least the message queue data collected over a period of time. The counter component transmits at least one of the message counting metrics to a message interface.

18 Claims, 4 Drawing Sheets

(56) References Cited

U.S. PATENT DOCUMENTS

2006/0212367 A1   9/2006  Gross
2008/0013452 A1   1/2008  Goetzinger et al.
2013/0195108 A1   8/2013  Hu et al.
2013/0290513 A1   10/2013 Shikari et al.

OTHER PUBLICATIONS

Duchovni, Victor, "QSHAPE(1)", Oct. 27, 2007. 2 pages.
Venema, Wietse, "QMGR(8)", Oct. 17, 2007. 6 pages.
Pre-Interview Communication dated Aug. 9, 2011, U.S. Appl. No. 12/132,416, filed Jun. 3, 2008.
First Action Interview Office Action dated Oct. 11, 2011, U.S. Appl. No. 12/132,416, filed Jun. 3, 2008.
Notice of Allowance dated Feb. 9, 2012, U.S. Appl. No. 12/132,416, filed Jun. 3, 2008.
Leonard, Mark D., "System and Method of Maintaining an Enqueue Rate of Data Messages into a Set of Queues," filed May 17, 2013, U.S. Appl. No. 13/897,220.
Office Action dated Nov. 19, 2015, filed May 17, 2013, U.S. Appl. No. 13/897,220.
Notice of Allowance dated May 2, 2016, filed May 17, 2013, U.S. Appl. No. 13/897,220.

* cited by examiner

SYSTEM AND METHOD OF CALCULATING AND REPORTING OF MESSAGES EXPIRING FROM A QUEUE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large business enterprises typically include computer systems that may be monitored to analyze performance efficiencies, such as for system optimization or error detection purposes. Examples of such systems are mainframe and personal computer networks, which may include queues for handling message requests. Message queues typically receive, process, and forward requests for information and services. Message queuing is a method of application-to-application communication, such as communication between an application that services a user and an application that retrieves data from a database. Applications may communicate by writing and reading application-specific data, or messages, to and from queues, without having a dedicated synchronous link between the applications. Messaging means that applications communicate with each other by sending discrete amounts of data in messages to some intermediary, and not necessarily by calling each other directly. Queuing implies that applications communicate through queues, which removes the requirement for both the sending application and the receiving application to execute concurrently and/or synchronously. In other words, the sending and receiving of messages is asynchronous, and there is typically no time dependency between sending and receiving, except that which may be imposed by the applications themselves.

SUMMARY

In some embodiments, a system is provided for monitoring message queue data. The system includes a computer readable storage medium comprising a message counter component stored as a set of computer instructions executable by a processor. The counter component detects the outflow of messages out of a message queue or through the queue manager of the message queue, wherein the outflow of messages comprise at least expired messages and at least received messages, wherein detecting comprises receiving a signal from a server. The counter component also differentiates the outflow of expired messages from the outflow of received messages, wherein the expired messages comprise messages purged from the server before being responded to by a processor and received messages comprise messages responded to by a processor. Additionally, the counter component collects message queue data, wherein collecting the message queue data comprises at least counting the outflow quantity of expired messages or at least counting the outflow quantity of received messages. Furthermore, the counter component calculates at least one of a plurality of message counting metrics based on at least the message queue data, wherein calculating message counting metrics comprises message queue data collected over a period of time. The counter component also transmits the at least one of the plurality of message counting metrics to a message interface.

In some embodiments, a system is provided for monitoring message queue data. The system includes a computer readable storage medium comprising a message counter component stored as a set of computer instructions executable by a processor. The counter component detects the outflow of messages out of a message queue or through the queue manager of the message queue, wherein the outflow of messages comprise at least expired messages and at least received messages, wherein detecting comprises receiving a signal from a server. The counter component also differentiates the outflow of expired messages from the outflow of received messages, wherein the expired messages comprise messages purged from the server before being responded to by a processor and received messages comprise messages responded to by a processor. Additionally, the counter component collects message queue data, wherein collecting the message queue data comprises at least counting the outflow quantity of expired messages or at least counting the outflow quantity of received messages. Furthermore, the counter component calculates at least one of a plurality of message counting metrics based on at least the message queue data, wherein calculating message counting metrics comprises message queue data collected over a period of time. The counter component also executes at least one of a plurality of message queue data corrective procedures based on the detection of the one or more message counting metric interest scenarios.

In some embodiments, a method for monitoring message queue data is provided. The method comprises detecting the outflow of messages out of a message queue or through the queue manager for the message queue, wherein the outflow of messages comprises expired messages and received messages, wherein detecting comprises receiving a signal from a server. The method further comprises differentiating the outflow of expired messages from the outflow of received messages. Additionally, the method comprises collecting message queue data, wherein collecting message queue data comprises at least counting the outflow quantity of expired messages or at least counting the outflow quantity of received messages. The method also comprises calculating at least one of a plurality of message counting metrics based on at least the collected message queue data, wherein calculating message counting metrics comprises collecting message queue data over a period of time. The method further comprises detecting one or more message counting statistic interest scenarios based on the calculation of at least one of the message counting statistics. Additionally, the method comprises executing at least one of a plurality of message queue data corrective procedures based on the detection of the one or more message counting statistic interest scenarios.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
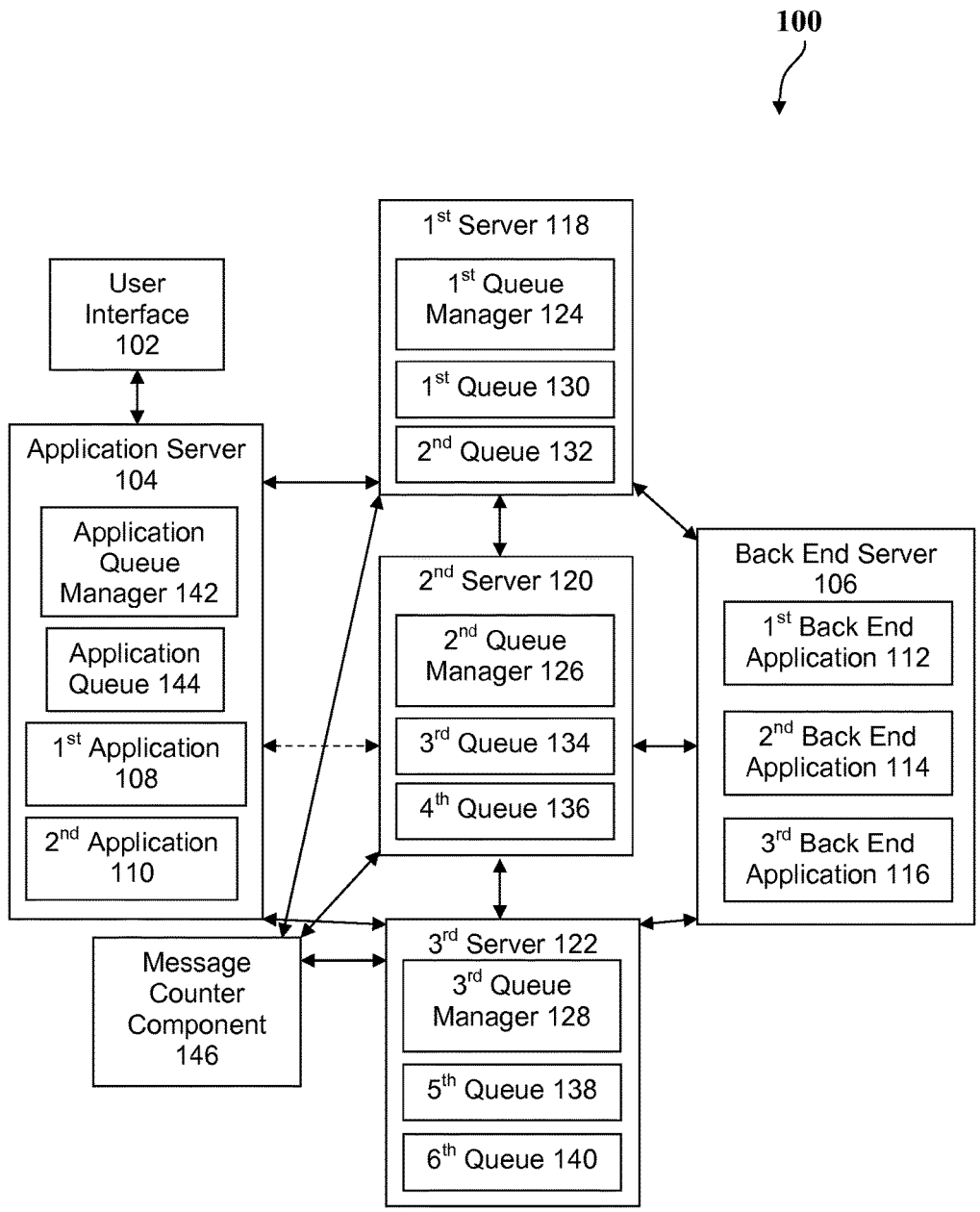
- FIG. 1 is a block diagram of a provisioning system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, the message queue data monitoring system may detect the outflow of messages out of a message queue or through a message queue manager of the message queue. Detecting the outflow of messages may allow the system to count and/or differentiate between messages, for example, between expired messages and received messages.

The message queue data monitoring system may differentiate the outflow of expired messages from the outflow of received messages. For example, messages may be transmitted into a message queue. Some messages may expire before being transmitted to a receiving component, while other messages may be transmitted to a receiving component. The expired messages may be purged from the message queue so that at some time, both the received messages and the expired messages leave the message queue. Differentiating between expired messages purged from the message queue and messages transmitted to a receiving component (i.e., received messages) may be useful to identify application and network issues. For example, if the expired messages can be differentiated from the received messages, an administrator may be able to detect a problem with one or more applications as a change in the rate of expired messages per received message may indicate a receiving component issue or an application issue.

In an embodiment, the message queue data monitoring system may collect message queue data, for example, by counting the quantity of expired messages and/or received messages transmitted out of a message queue over a period of time. In an embodiment, collecting message queue data may comprise storing the message queue data to calculate one or more message counting metrics. Collecting message queue data may also comprise counting the inflow of messages into the message queue.

The message queue data monitoring system may also detect one or more message counting metric interest scenarios. For example, if the ratio of expired messages to received messages exceeds a threshold, the message queue data monitoring system may detect a message counting metric interest scenario. Another aspect of the message queue data may execute one or more message queue data corrective procedures based on the detection of the one or more message counting metric interest scenarios. For example, when the ratio of expired messages to received messages exceeds a threshold, the message queue data monitoring system may execute the message queue data corrective procedure of sounding an alarm. This may alert an administrator and/or client implementing one or more applications that the ratio of expired message to received message has exceeded the threshold.

A message queue system may be implemented using a message queue software, also known as a message-oriented middleware, and may be located in a network or data center component, such as at a server or other computer hardware component (e.g., a network interface card (NIC)). The message queue system may comprise one or more message queues that store a plurality of messages, and may be managed by a queue manager application. A message queue may be an object, e.g., a software based data structure in a memory component that stores the messages. The message queue may store messages sent from, for example, application(s) prior to delivering or transmitting the messages to a receiving component or after receiving the messages from a transmitting component in a network or data center. Messages sent to the receiving component and/or a receiving application may be called received messages. Messages may be requested and/or removed from the queue by the receiving application. Messages may comprise collections of binary or character data, e.g., American Standard Code for Information Interchange (ASCII) or Extended Binary Coded Decimal Interchange Code (EBCDIC) characters. The data may be interpreted by an application or program and/or used by hardware to implement a function. The messages may also comprise communications protocols, storage, routing, and/or delivery information, which may be added to the messages before transmission and removed from the messages after receiving the messages or prior to delivering the messages to a receiving application. The message queue may also store messages sent from, for example, application(s) which may expire and thus will not be delivered or transmitted to a receiving component. Messages which expire before being sent to a receiving component may be called expired messages. For example, messages may expire after a predetermined amount of time upon being disposed in a message queue. If a message is transmitted to a receiving component, it may be considered a received message. However, if the message is not transmitted to a receiving component the message may be considered an expired message. Expired messages may then flow out of the message queue (i.e., outflow of expired messages) and deleted, stored in another queue such as an expired message queue, marked invalid, sent back to the originator the message, and/or the like.

FIG. 1 is a block diagram that illustrates a system 100 for monitoring message queue data according to some embodiments of the present disclosure. The system 100 includes a user interface 102, an application server 104, and a back end server 106. The user interface 102 enables a user of the system 100 to view information requested from the back end server 106 via the application server 104 and/or to control execution of the application server 104. The application server 104 executes applications 108 and 110 that can request data from back end applications 112, 114, and 116 executed by the back end server 106.

Messages, such as data requests made by the applications 108 and 110, can travel through a cluster of servers 118, 120 and 122 before reaching the back end applications 112, 114, and 116. The cluster of servers 118, 120, and 122 implement queue managers 124, 126, and 128 and queues 130, 132, 134, 136, 138, and 140 that enable the applications 108 and 110 to communicate with the back end applications 112, 114, and 116 by message queuing, such that a dedicated synchronous link between the applications 108 and 110 and the back end applications 112, 114, and 116 is not required. The queues 130, 132, 134, 136, 138, and 140 may be for example, International Business Machines (IBM) Message Queuing (MQ) Series message queues, Java® Message Service (JMS) queues, or other message services queues known to one of ordinary skill in the art that may be employed.

The servers 104, 106, and 118, 120, and 122 may be associated with a plurality of networks or data center components, such as network nodes, routers, or data center computer systems. The servers may comprise memory components that host the applications and associated objects or data structures, and processing components that process the applications and objects. Some servers may also be located on the same component, such as at least some of the servers 118, 120, and 122. For example, the cluster of servers 118, 120, and 122 may be a plurality of NICs in a server rack at a data center. The queue managers 142 and 124, 126, and 128 may be applications hosted in the servers that manage the corresponding queues, also be hosted in the servers. While the components are represented as communicating via arrows, it is understood that all the components may communicate via a communication network provided by one or more private networks, one or more public networks, or a combination thereof.

Each server in the cluster of servers 118, 120, and 122 may include one or more of the queue managers 124, 126, and 128 to determine whether messages received are intended for one of the server's queues or intended to be temporarily stored and subsequently forwarded to another server's queues. For example, a first server 118 includes a first queue manager 124, a second server 120 includes a second queue manager 126, and a third server 122 includes a third queue manager 128. Each of the queue managers 124, 126, and 128 may manage a transmission queue and a local queue, an inbound queue and an outbound queue, or any other types of queues. For example, the first queue manager 124 may manage a first queue 130 and a second queue 132, the second queue manager 126 may manage a third queue 134 and a fourth queue 136, and the third queue manager 128 may manage a fifth queue 138 and a sixth queue 140. The queue managers 124, 126, and 128 may be located separately on the servers 118, 126, and 122, or any combination of the queue managers 124, 126, and 128 may be located on any of the servers 118, 120, and 122. Furthermore, the queues 130, 132, 134, 136, 138, and 140 may be located in separate pairs on the servers 118, 120, and 122, in any combination on any of the servers 118, 120, and 122, or on other servers which are not pictured.

The application server 104 has an application queue manager 142 that manages an application queue 144 and determines where a message will be initially sent to communicate with the back end applications 112, 114, and 116. For example, the application queue manager 142 sends a first message from the application queue 144 for the first application 108 to the first queue 130, which may be referred to as the first transmission queue 130. The first queue manager 124 may evaluate messages received on the first transmission queue 130, and determine whether each message can be serviced locally by the second queue 132, which may be referred to as the first local queue 132, or needs to be forwarded to another queue. In this example, the first queue manager 124 takes the first message from the first queue 130 and puts the first message on the second queue 132, which makes the message directly available to the first back end application 112. Subsequently, the first back end application 112 may check the second queue 132 for messages that can be serviced locally, and provide the data requested by the message. After the first back end application 112 provides the data requested by the message, the first queue manager 124 may transfer the message from the second queue 132 back to the first queue 130. The first queue 130 may return the message with the requested data back to the application queue 144 for the first application 108.

In another example, the application queue manager 142 may send a second message from the application queue 144 for the second application 110 to the first queue 130. If the first queue manager 124 determines that the message cannot be serviced locally by the second queue 132, the first queue manager 124 may forward the message in the first queue 130 to another queue. The first queue manager 124 may forward the message to a queue associated with a queue that directly services the message or to a queue that forwards the message on to yet another queue. The queue that directly services the message may be referred to as the destination queue for the message. Continuing this example, the first queue manager 124 may forward the message to the third queue 134, which may be referred to as the third queue 134.

The second queue manager 126 evaluates messages received on the second transmission queue 134, and determines whether each message can be serviced locally by the fourth queue 136, which may be referred to as the second local queue 136, or needs to be forwarded to another transmission queue. If the second queue manager 126 determines that the message can be serviced locally by the second local queue 136, the second queue manager 126 transfers the message from the second transmission queue 134 to the second local queue 136. If the second local queue 136 is a queue that is serviced by the second back end application 114, the second local queue 136 may be the destination queue for the message. Subsequently, the second back end application 114 may check the second local queue 136 for messages that can be serviced locally, and provides the data requested by the message. After the second back end application 114 provides the data requested by the message, the second queue manager 126 may transfer the message with the data from the second local queue 136 back to the second transmission queue 134. The second transmission queue 134 then returns the message with the requested data back to the application queue 144 for the second application 110.

The application queue manager 142 may monitor the sequence in which the application queue manager 142 sends messages to the servers 118, 120, 122, and use this sequence to load balance and distribute the messages appropriately between the servers 118, 120, 122 over time. The application queue manager 142 may perform other functions known to one skilled in the art. The system 100 also comprises a message counter component 146, which may be an application that monitors message queue data in the system 100, e.g., to monitor the quantity of messages flowing into and/or out of a message queue and/or through a message queue manager. Although depicted in FIG. 1 as separate from the servers 104 and 106 and 118, 120, and 122, the message counter component 146 can be executed anywhere in the system 100. The numbers of user interfaces, management components, application servers, clustered servers, back end servers, queue managers, and queues in the system 100 are depicted in FIG. 1 for the purpose of an illustrative example, as the system 100 can include any number of user interfaces, management components, application servers, clustered servers, back end servers, queue managers, and queues. In some embodiments, an application server or a back end server may also comprise a queue manager and one or more corresponding queues.

The message counter component 146 may monitor and detect the outflow of messages out of a message queue or server, such as any of the queues in the servers 118, 120, and 122. In an embodiment, the outflow of messages may comprise expired messages. Expired messages may comprise messages transmitted from an application to a server which remain within the server beyond a predetermined period of time without a processor, for example, responding to the message. For example, an application, such as application 108, may transmit a message to a server, such as server 118. The queue manager of the server, such as queue manager 124, may distribute the message to a queue, such as the first queue 130, to generate a response to the message by a processor, for example a processor of a backend server. However, the message may sit in the queue without retrieved and/or received by a processor. The application transmitting the message may configure the message to expire after an predetermined period of time, so that if the processor does not generate a response to the message after the predetermined period of time the message expires (i.e. attains expired status) and can no longer be retrieved by the processor. Generally, expired messages may be purged from the server, for example, after being deemed expired.

In an embodiment, the outflow of messages may further comprise received messages. Received messages may comprise messages transmitted from an application to a server which a processor receives and/or responds to before the message expires. For example, an application, such as application 108, may transmit a message to a server, such as server 118. The queue manager of the server, such as queue manager 124, may distribute the message to a queue, such as the first queue 130, to generate a response to the message by a processor. The message may be received and/or responded to (i.e., attaining received status) by a processor only before a predetermined period of time passes (i.e., before the message attains expired status). Generally, when the processor responds to the message before a predetermined amount of time, the processor sends a message from the server back to the application with instructions based on the message received.

The message counter component 146 may also differentiate the outflow of expired messages from the outflow of received messages and collect message queue data comprising at least counting the outflow quantity of expired messages or at least counting the outflow quantity of received messages. For example, the message counter component 146 may collect message queue data by counting the outflow quantity of expired messages and by counting the outflow quantity of received messages. In an embodiment, the message counter component 146 may collect message queue data in addition to at least counting the outflow quantity of expired messages or at least counting the outflow quantity of received messages. For example, the message counter component 146 may collect message queue data by counting the outflow quantity of expired messages and by counting the outflow quantity of failed messages. One of ordinary skill in the art will appreciate after reading this disclosure the various types of messages which may flow out of a server and/or queue.

The message counter component 146 may also calculate one or more message counting metrics based on at least the message queue data. In an embodiment, message counting metrics may be based on the outflow quantity of expired messages. For example, the message counter component 146 may detect the inflow of messages into a server and message queue data may further comprise at least the inflow quantity of messages into a server. For example, the inflow quantity of messages into a server may be 100,000 messages. Additionally, the outflow quantity of expired messages may be 5,000 expired messages. Thus, the message counter component 146 may calculate the percentage of expired messages purged out of the server from the total quantity of message sent by one or more applications into the server (in this case 5%). In an embodiment, message counting metrics may be based on the outflow quantity of received messages and the outflow quantity of expired messages. For example, the outflow quantity of received messages may be 90,000 received messages and the outflow quantity of expired messages may be 10,000 expired messages. Thus, the message counter component 146 may calculate the percentage of expired messages purged out of the server from the total outflow quantity of messages (i.e. at least the received messages and expired messages) (in this case 10%).

In an embodiment, the message counter component 146 may calculate message counting metrics based on message queue data collected over a period of time. In an embodiment, the period of time may comprise a time frame selected by the message counter component 146 and/or a time frame selected by an administrator. For example, a network administrator may inquire about the percentage of expired messages purged out of a particular queue from the total quantity of messages sent by one or more applications into the server during a typically high message traffic time through the queue over a two hour period. The message counter component 146 may collect the quantity of expired messages purged from the queue over the specified two hour period. Additionally, the message counter component may collect the outflow quantity of received messages over the same two hour period. In an embodiment, the period of time may comprise the time between two or more message queue resets. For example, the message counter component 146 may begin counting the quantity of messages flowing into a queue after a message queue reset. Additionally, the message counter component 146 may also begin counting the quantity of expired messages purged from the same queue and/or server after the same message queue reset (i.e. at the same time the message counter component 146 begins counting the quantity of messages flowing into the queue). The message counter component 146 may collect message queue data comprising counting both the quantity of messages flowing into the queue and/or server as well as the quantity of expired messages purged from the queue and/or server until the next message queue reset occurs. Once the next message queue reset occurs, the message counter component 146 may calculate one or more message counting metrics based on the collected quantity of messages flowing into the queue and the quantity of expired messages flowing out of the queue (i.e. message queue data) counted between the two message queue resets.

In an embodiment, message queue metrics may be calculated after two or more message resets. For example, the message counter component 146 may begin counting the quantity of messages flowing into a queue after a message queue reset. Additionally, the message counter component 146 may also begin counting the quantity of expired messages purged from the same queue and/or server after the same message queue reset (i.e. at the same time the message counter component 146 begins counting the quantity of messages flowing into the queue). The message counter component 146 may collect message queue data comprising counting both the quantity of messages flowing into the queue and/or server as well as the quantity of expired messages purged from the queue and/or server through a message queue reset and until the next message queue reset occurs. Once the next message queue reset occurs, the message counter component 146 may calculate one or more message counting metrics based on the collected quantity of messages flowing into the queue and the quantity of expired messages flowing out of the queue (i.e. message queue data) counted between the two message queue resets.

In an embodiment, a message queue reset may comprise deleting all the messages in a queue and/or a server. For example, before a message queue reset a queue may have 100,000 messages in it. However, after the reset, all 100,000 messages in the queue may be deleted before more message may move into the queue. In an embodiment, a message queue reset may comprise resetting (i.e. starting over at zero) the counting of the outflow quantity of expired messages or the counting of the outflow quantity of received messages. For example, before the message queue reset a queue may again have 100,000 messages in it. Additionally, after the message queue reset, the queue may still have 100,000 messages in it. However, after the message queue reset, the message counter component 146 may have started counting the outflow quantity of expired messages from zero messages beginning at the time of the message queue reset and/or counting the outflow quantity of received messages from zero messages beginning at the time of the message queue reset. In an embodiment, a message queue reset may comprise resetting (i.e. starting over at zero) the counting of the inflow quantity of messages into a queue and/or a server. In an embodiment, the time between two resets may comprise between about 10 seconds and about one hour. One of ordinary skill in the art will appreciate after reading this disclosure how long the time between two message queue resets may be.

In an embodiment, the message counter component 146 may transmit, for example to a user interface, such as user interface 102, a request to display at least one of the plurality of message counting metrics. For example, an administrator may have inquired about one or more message counting metrics over a period of time. The administrator may specify a particular time frame for displaying one or more message counting metrics. The message counter component 146 may collect the appropriate message counting data over the specified period of time, calculate the message queue metrics, and display the message queue metrics on a user interface, for further analysis by the administrator.

The message counter component 146 may detect one or more message counting metric interest scenarios based on the calculation of at least one of the message counting metrics. In an embodiment, the message counting metric interest scenarios may comprise exceeding a threshold ratio at least of the quantity of expired messages flowing out of a queue per the quantity of total message flowing into the queue or at least of the quantity of expired messages flowing out of a queue per the quantity of received messages flowing out of the queue. The threshold ratio may be different for different message counting metrics. Additionally, the threshold ratio may be changed for a particular message counting metric, for example, because of a change in queue or queue conditions. In an embodiment, the threshold ratio may comprise between 3% and 20%. For example, the message counter component 146 may calculate the message counting metric of the expired messages flowing out of a queue per the quantity of received messages flowing out of the same queue. An administrator, for example, may set threshold ratio for this metric to be 10%. The message counter component 146 may detect that the ratio is 15% and thus determine that a message counting metric interest scenario exists.

In an embodiment, the message counting metric interest scenarios may comprise exceeding a threshold rate of change of at least the ratio of expired messages per received messages at one or more messages queue resets or at least the ratio of expired messages per inflow of total messages at one or more message queue resets. The threshold rate of change may be different for different message counting metrics. Additionally, the threshold rate of change may be changed for a particular message counting metric, for example, because of a change in queue or queue conditions. In an embodiment, the threshold rate of change may comprise between 5% and 75%. For example, the message counter component 146 may calculate the message counting metric of the expired messages flowing out of a queue per the quantity of received messages flowing out of the same queue. An administrator, for example, may set threshold ratio for this metric to be 10%. The message counter component 146 may calculate the message counting metric after, for example, a message queue reset. The message counter component 146 may detect that the ratio is 3% and thus detect that the ratio is below the threshold ratio. The message counter component 146 may then calculate the message counting metric of the expired messages flowing out of a queue per the quantity of received messages flowing out of the same queue a second time. The message counter component 146 may calculate the message counting metric after, for example, the next message queue reset. The message counter component 146 may detect that the ratio is 5% and thus detect that the ratio is below the threshold ratio. However, an administrator, for example, may set threshold rate of change for this metric to be 50%. The message counter component 146 may detect that the rate of change between ratios is 67% ((5%−3%)/(3%)) and thus determine that a message counting metric interest scenario exists.

In an embodiment, the message counting metric interest scenarios may comprise exceeding a threshold change in velocity of at least the ratio of expired messages per received messages at one or more messages queue resets or at least the ratio of expired messages per inflow of total messages at one or more message queue resets. The threshold change in velocity may be different for different message counting metrics. Additionally, the threshold change in velocity may be changed for a particular message counting metric, for example, because of a change in queue or queue conditions. In an embodiment, the threshold change in velocity may comprise between 50% and 300%. For example, the message counter component 146 may calculate that the rate of change of the ratio of the expired messages flowing out of a queue per the quantity of received messages flowing out of the same queue is 10%. An administrator, for example, may set the threshold rate of change for this metric to be 50% and thus detect that the rate of change is below the threshold rate of change. The message counter component 146 may again calculate that the rate of change of the ratio of the expired messages flowing out of a queue per the quantity of received messages flowing out of the same queue and determine that the rate of change is 45% and thus still below the threshold rate of change of 50%. However, an administrator, for example, may set the threshold change in velocity for this metric to be 250%. The message counter component 146 may detect that the change in velocity is 350% ((45%−10%)/(10%)) and thus determine that a message counting metric interest scenario exists.

In an embodiment, the message counter component 146 may execute one of a plurality of message queue data corrective procedures based on the detection of the one or more message counting metric interest scenarios. In an embodiment, message queue data corrective procedures may comprise at least sounding an alarm, at least requesting the expiration time of messages from one or more clients, or at least requesting one or more clients to increase the expiration time of messages. For example, the message counter component 146 may detect that the ratio of expired messages per received messages at one or more messages queue resets exceeded a predetermined threshold. Upon detecting that the ratio threshold has been exceeded, the message counter component 146 may execute the message queue data procedure of sounding an alarm. In an embodiment, sounding an alarm comprises providing a notification to, for example, an administrator, alerting that a threshold ratio has been exceeded. In addition to sounding an alarm, the message counter component 146 may identify the clients sending messages into the queue. The message counter component 146 may identify which of those clients may be sending messages pushing the ratio to exceed the threshold, for example, by requesting the expiration time of messages sent from each client. In an embodiment, upon determining which client messages are causing the ratio to exceed the threshold, the message counting component 146 may send a message to the clients requesting the clients to extend the predetermined amount of time that a message expires.

As previously disclosed, the message counter component 146 may detect the outflow of received and expired messages. In an embodiment, the message counter component 146 may also detect the inflow of messages into a queue, such as first queue 130, and/or a server, such as first server 118. In an embodiment, the inflow of messages into a queue may comprise messages that once in the queue may become received messages and/or expired messages, as previously disclosed. Additionally, as previously disclosed, the message counter component 146 may collect message queue data. In an embodiment, message queue data may comprise the inflow of messages into a queue and/or server and so that one or more message counter metrics may be based on at least inflow messages In an embodiment, the message counter component 146 may collect message queue data comprising queue depth. Queue depth may comprise the maximum number of messages in a message queue at one time measured over a selected amount of time. In an embodiment, the selected amount of time may comprise the time between two or more message queue resets, as will be discussed further herein. Queue depth may also comprise the current number of messages within a queue. In an embodiment, the current number of messages may be measured at the time the measurement is taken, for example, at the time immediately before a message queue reset. Queue depth may also be used to calculate one or more message counting metrics, as will also be discussed further herein.

In an embodiment, message counting metrics may be based on at least queue depth. For example, the message counter component 146 may detect queue depth and message queue data may further comprise at least queue depth. For example, the quantity of expired messages purged from a queue may be 1,000 messages. Additionally, the queue depth may be 10,000 messages. Thus, the message counter component 146 may calculate the percentage of expired messages purged out of the queue from the queue depth (in this case 10%).

Figure 2:
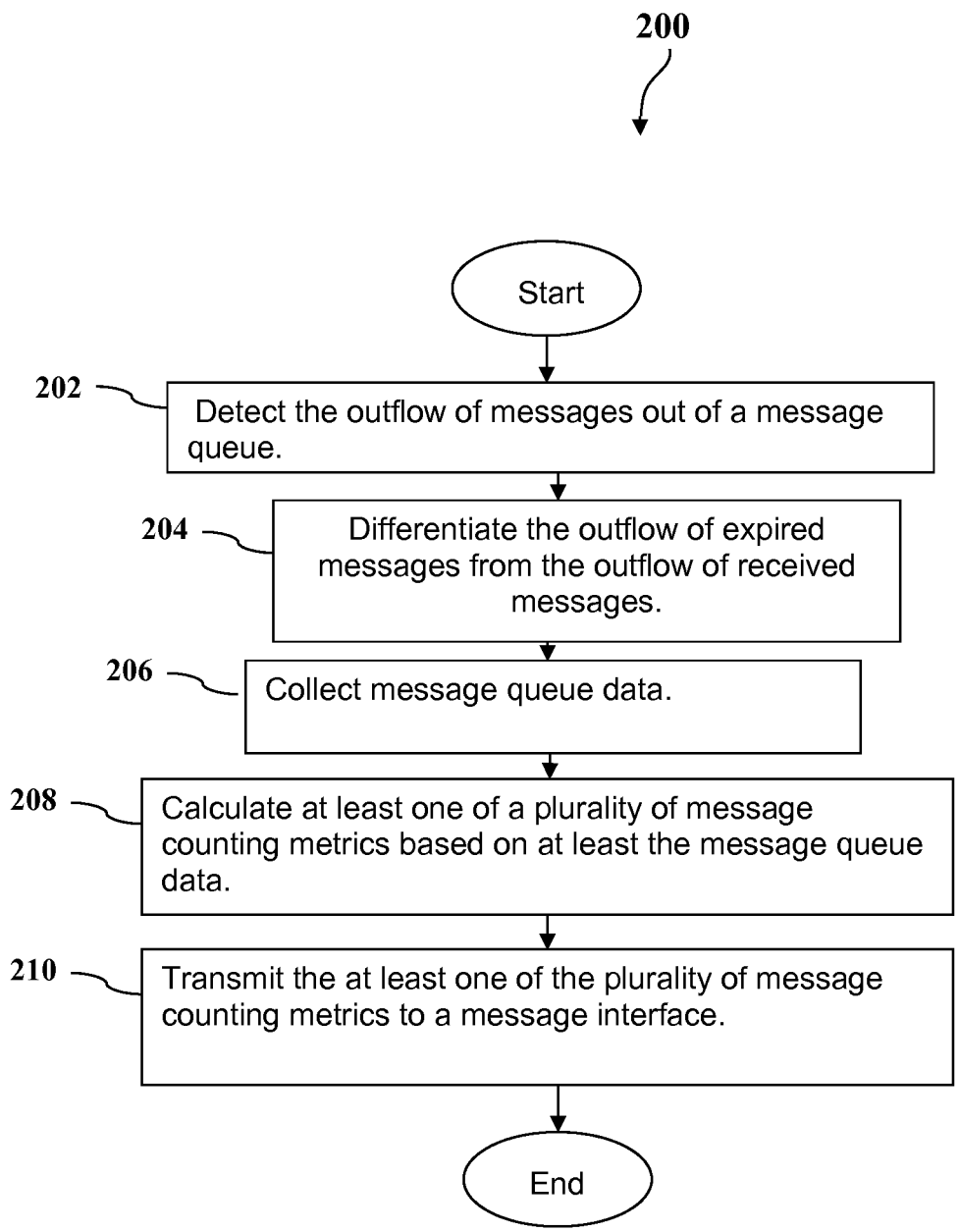
FIG. 2 is a flow chart of a method according to an embodiment of the disclosure.

FIG. 2 is a flowchart that illustrates a method 200 for monitoring message queues according to embodiments of the present disclosure. Executing the method 200 enables an administrator, for example, to differentiate between expired messages and received messages sent from a queue and/or server to inform the administrator of the quantity of expired and received messages sent from the queue and/or server. For example, the method 200 may be implemented by the message counter component 146 or any other software and/or hardware component in the system 100.

In box 202, the outflow of messages out of a message queue or through the queue manager for the message queue may be detected. For example, a plurality of messages comprising expired messages and received messages may be sent out of the message queue. The message counter component 146 may detect messages flowing from the queue, for example, counting the messages flowing from the queue.

In box 204, the outflow of expired messages may be differentiated from the outflow of received messages. For example, one or more messages transmitted from the message queue may comprise expired messages and one or more messages transmitted from the message queue may comprise received messages. Upon detecting the outflow of messages from a queue, the message counter component 146 may differentiate between expired messages and received messages, for example, to count both the quantity of expired messages and the quantity of received messages transmitted from a message queue over a period of time.

In box 206, message queue data may be collected. For example, upon differentiating expired messages from received messages, the message counter component may count the quantity of expired and received messages transmitted from a message queue over a period of time and may collect the data comprising those quantities.

In box 208, at least one of a plurality of message counting metrics based on at least the collected message queue data may be calculated. For example, after collecting message queue data comprising the quantity of received messages and expired messages flowing out of a message queue over a period of time, the message counter component may calculate the message counting metric of expired messages per received messages per minute.

In block 210, at least one of the plurality of message counting metrics may be transmitted to, for example, a message interface. For example, the message counter component may transmit the message counting metric of expired messages per received messages per minute to a computer monitor.

Figure 3:
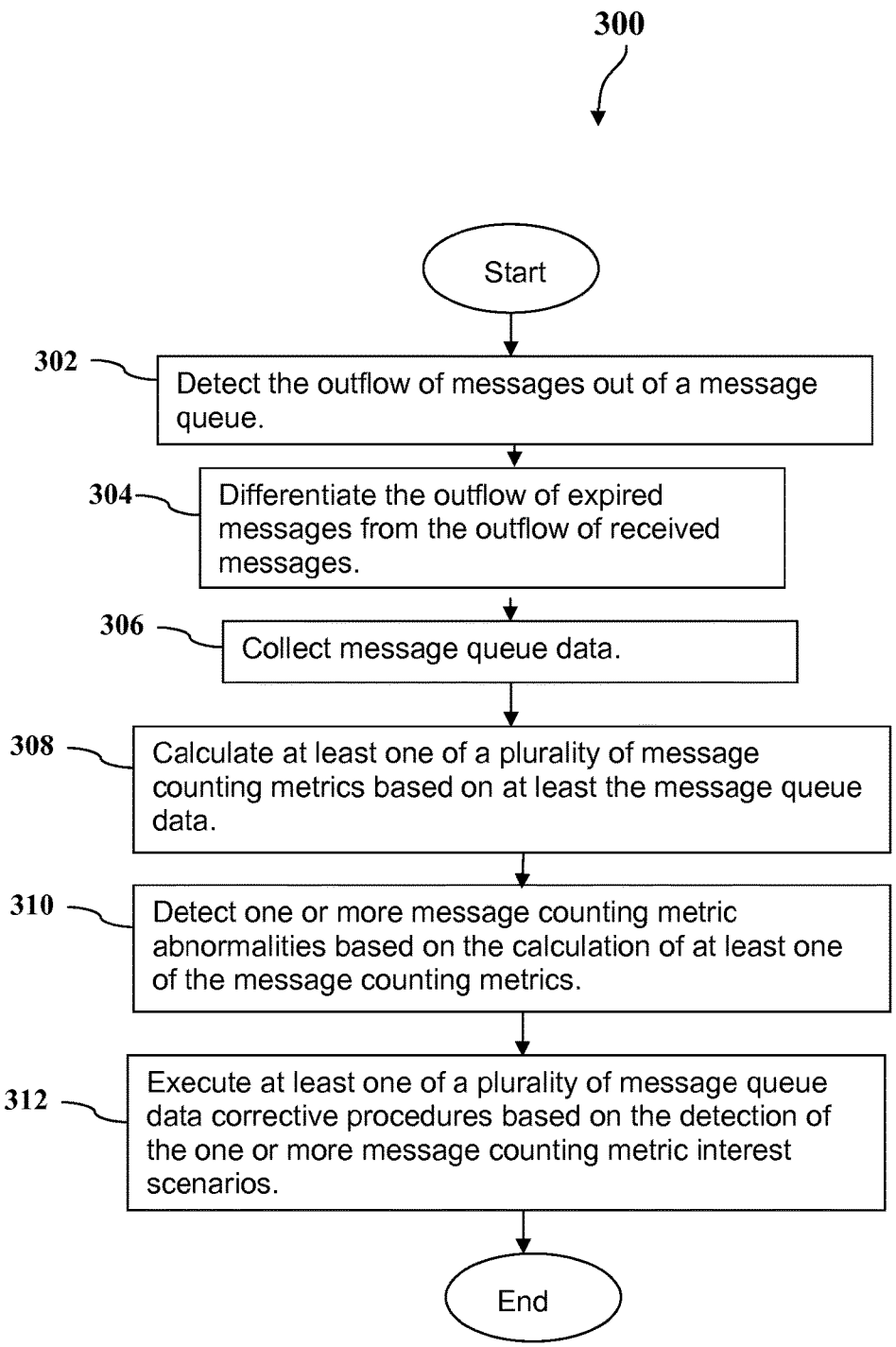
FIG. 3 is a flow chart of a method according to an embodiment of the disclosure.

FIG. 3 is a flowchart that illustrates another method 300 for monitoring message queues according to embodiments of the present disclosure. Executing the method 300 enables an administrator, for example, to differentiate between expired messages and received message sent from a queue and/or server and to execute message queue data corrective procedures to ensure that enough messages sent from client applications are received and responded to by a processor. For example, the method 300 may be implemented by the message counter component 146 or any other software and/or hardware component in the system 100.

In box 302, the outflow of messages out of a message queue or through the queue manager for the message queue may be detected. For example, a plurality of messages comprising expired messages and received messages may be sent out of the message queue. The message counter component may detect messages flowing from the queue, for example, to count the messages flowing from the queue.

In box 304, the outflow of expired messages may be differentiated from the outflow of received messages. For example, one or more messages transmitted from the message queue may comprise expired messages and one or more messages transmitted from the message queue may comprise received messages. Upon detecting the outflow of messages from a queue, the message counter component 146 may differentiate between expired messages and received messages, for example, to count both quantity of expired messages and the quantity of received messages transmitted from a message queue over a finite period of time.

In box 306, message queue data may be collected. For example, upon differentiating expired messages from received messages, the message counter component may count the quantity of expired and received messages transmitted from a message queue over a finite period of time and may collect the data comprising those quantities.

In box 308, at least one of a plurality of message counting metrics based on at least the collected message queue data may be calculated. For example, after collecting message queue data comprising the quantity of received messages and expired messages flowing out of a message queue over a period of time, the message counter component may calculated the message counting metric of expired messages per received messages per minute.

In block 310, one or more message counting metric interest scenarios based on the calculation of at least one of the message counting metrics may be detected. When a message counting metric exceeds a threshold, the message counter component 146 may detect a message counting metric interest scenario, for example, in order to correct the message counting metric interest scenario.

In block 312, at least one of a plurality of message queue data corrective procedures based on the detection of the one or more message counting metric interest scenarios may be executed. For example, in order correct a message counting metric interest scenario, the message counter component 146 may sound an alarm alerting an administrator of the message counting metric interest scenario.

Figure 4:
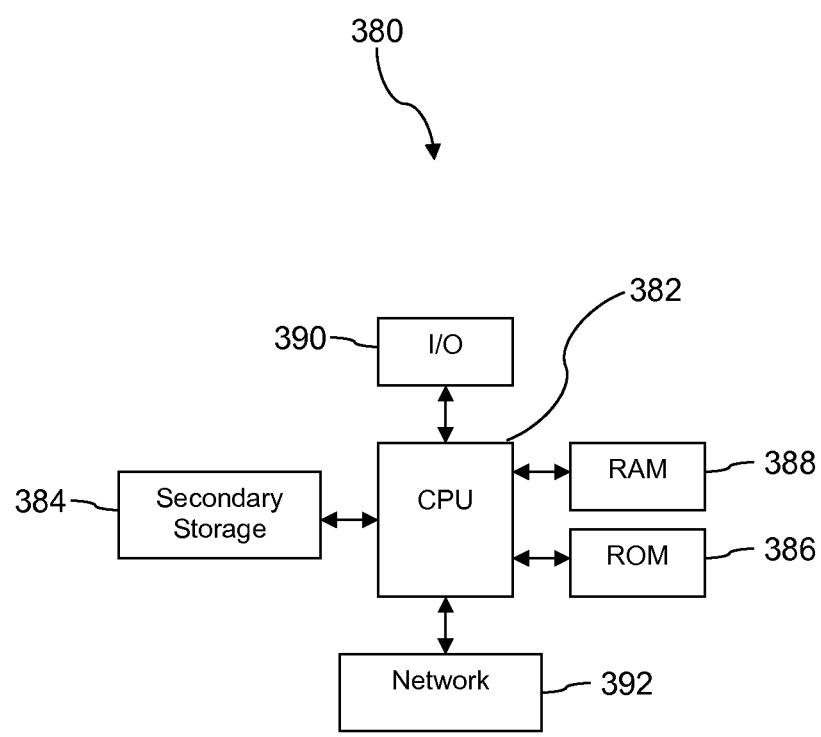
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), 4th generation, 5th generation, and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for monitoring message queue data, comprising:
   a message queue data monitoring system comprising a message counter component stored on a non-transitory memory of a server and executed by a processor, wherein the message queue data monitoring system:
   detects, by receiving a signal from the server, an outflow of messages out of a message queue or through a queue manager of the message queue, wherein the outflow of messages comprises an outflow of expired messages and an outflow of received messages,
   differentiates the outflow of expired messages from the outflow of received messages, wherein the expired messages comprise messages purged from the server before being responded to by a processor and the received messages comprise messages responded to by a processor, collects message queue data by counting a quantity of expired messages in the outflow of expired messages and by counting a quantity of received messages in the outflow of received messages, calculates at least one message counting metric of a plurality of message counting metrics based on at least the message queue data collected over a period of time, wherein the calculated message counting metric comprises a ratio of the quantity of expired messages in the outflow per the quantity of received messages in the outflow, determines that the calculated message counting metric exceeds a threshold ratio of expired messages per received messages over the period of time, and in response to the determination that the calculated message counting metric exceeds the threshold, executes a message queue data corrective procedure that includes:

requesting, by the message queue data monitoring system, expiration times of messages sent from each client, determining, by the message queue data monitoring system, which one or more clients are responsible for causing the calculated message counting metric to exceed the threshold based on the expiration times, and sending, by the message queue data monitoring system, a message to the one or more clients requesting the one or more clients to increase the expiration times of messages sent from the one or more clients, wherein increasing the expiration times of the messages from the one or more clients enables the messages from the one or more clients to be stored in the message queue for processing for a longer amount of time before being purged.

2. The system of claim 1, wherein the message counter component further detects at least one of an inflow of messages into the message queue or through the queue manager of the message queue.

3. The system of claim 2, wherein the plurality of message counting metrics comprises the quantity of expired messages per a quantity of messages in the inflow of messages.

4. The system of claim 2, wherein the message queue data comprises at least one of a quantity of messages into the message queue or through the queue manager of the message queue.

5. The system of claim 1, wherein the period of time comprises a time between two or more message queue resets, and wherein the plurality of message counting metrics are calculated at each message queue reset.

6. The system of claim 1, wherein the message queue and the queue manager are hosted in a memory component of the server that is coupled to a plurality of other servers, in a data center or a network, and wherein at least some of the plurality of other servers comprise a plurality of other message queues and other queue managers in communications with the message queue and the queue manager.

7. The system of claim 1, wherein the message counter component further detects a queue depth, wherein the queue depth comprises at least a total number of messages in the message queue at a particular time or at least a maximum amount of messages in the message queue during the period of time.

8. The system of claim 1, wherein the collected message queue data of each of the message queue and the queue manager is maintained and updated in a corresponding object in a computer memory component, and wherein the outflow quantity of expired messages and the outflow quantity of received messages are maintained in corresponding files in a non-transitory computer storage medium.

9. A system for monitoring message queue data, comprising:

a message queue data monitoring system comprising a message counter component stored on a non-transitory memory of a server and executed by a processor, wherein the message queue data monitoring system:

detects, based on a signal received from the server, an outflow of messages out of a message queue or through a queue manager of the message queue, wherein the outflow of messages comprises an outflow of expired messages and an outflow of received messages, differentiates the outflow of expired messages from the outflow of received messages, wherein the expired messages comprise messages purged from the server before being responded to by a processor and the received messages comprise messages responded to by a processor, collects message queue data by counting a quantity of expired messages in the outflow of expired messages and by counting a quantity of received messages in the outflow of received messages, calculates at least one message counting metric of a plurality of message counting metrics based on at least the message queue data collected over a period of time, wherein the calculated message counting metric comprises a ratio of the quantity of expired messages in the outflow per the quantity of received messages in the outflow, detects at least one message counting metric interest scenario of a plurality of message counting metric scenarios based on the calculation of the message counting metric, wherein the message counting metric interest scenario comprises the calculated message counting metric exceeding a threshold ratio of expired messages per received messages over the period of time, and based on the detection of the message counting metric interest scenario, executes at least one message queue data corrective procedure of a plurality of message queue data corrective procedures, the message queue data corrective procedure including:

requesting, by the message queue data monitoring system, expiration times of messages sent from each client, determining, by the message queue data monitoring system, which one or more clients are responsible for causing the calculated message counting metric to exceed the threshold based on the expiration times, and sending, by the message queue data monitoring system, a message to the one or more clients requesting the one or more clients to increase the expiration times of messages sent from the one or more clients, wherein increasing the expiration times of the messages from the one or more clients enables the messages from the one or more clients to be stored in the message queue for processing for a longer amount of time before being purged.

10. The system of claim 9, wherein the plurality of message counting metric interest scenarios comprises exceeding a threshold ratio of expired messages per total outflow of messages over the period of time.

11. The system of claim 9, wherein the period of time comprises a time between at least two message queue resets, and wherein the plurality of message counting metrics are calculated at each message queue reset.

12. The system of claim 11, wherein the plurality of message counting metric interest scenarios comprises exceeding a threshold change in a rate of change of at least one of a ratio of expired messages per received messages at one or more message queue resets or a ratio of expired messages per inflow of messages at one or more message queue resets.

13. The system of claim 12, wherein the message counter component further detects an inflow of messages into the message queue or through the queue manager of the message queue.

14. The system of claim 13, wherein the message queue data comprises at least one of the inflow of messages into the message queue or through the queue manager of the message queue.

15. The system of claim 13, wherein the plurality of message counting metric interest scenarios comprises exceeding a threshold rate of change of at least one of a ratio of expired messages per received messages at one or more message queue resets or a ratio of expired messages per inflow of messages at one or more message queue resets.

16. The system of claim 9, wherein the plurality of message queue data corrective procedures comprises sounding an alarm.

17. A computer implemented method for monitoring message queue data, comprising:
- detecting, by a message queue data monitoring system that comprises a message counter component stored in a non-transitory memory and executable by a processor, via receiving a signal from a server, an outflow of messages out of a message queue or through a queue manager for the message queue, wherein the outflow of messages comprises an outflow of expired messages and an outflow of received messages;
- differentiating, by the message queue data monitoring system, the outflow of expired messages from the outflow of received messages;
- collecting, by the message queue data monitoring system, message queue data by counting a quantity of expired messages of the outflow of expired messages and by counting a quantity of received messages of the outflow of received messages;
- calculating, by the message queue data monitoring system, at least one message counting metric of a plurality of message counting metrics based on at least the message queue data collected over a period of time, wherein the calculated message counting metric comprises a ratio of the quantity of expired messages in the outflow per the quantity of received messages in the outflow;
- detecting, by the message queue data monitoring system, at least one message counting metric interest scenario based on the calculation of the calculated message counting metric, wherein the message counting metric interest scenario comprises the calculated message counting metric exceeding a threshold ratio of expired messages per received messages over the period of time; and
- based on the detection of the message counting metric interest scenario, executing, by the message queue data monitoring system, a message queue data corrective procedure that includes:
  - requesting, by the message queue data monitoring system, expiration times of messages sent from each client,
  - determining, by the message queue data monitoring system, which one or more clients are responsible for causing the calculated message counting metric to exceed the threshold based on the expiration times, and
  - sending, by the message queue data monitoring system, a message to the one or more clients requesting the one or more clients to increase the expiration times of messages sent from the one or more clients, wherein increasing the expiration times of the messages from the one or more clients enables the messages from the one or more clients to be stored in the message queue for processing for a longer amount of time before being purged.

18. The method of claim 17, further comprising detecting, by the message counter component, an inflow of messages into the message queue or through the message queue manager for the message queue.

* * * * *